United States Patent
Nagel et al.

(10) Patent No.: US 9,463,931 B2
(45) Date of Patent: Oct. 11, 2016

(54) ARTICLE DIVERTING CONVEYOR BELT

(71) Applicant: Laitram, L.L.C., Harahan, LA (US)

(72) Inventors: Jorge E. Nagel, New Orleans, LA (US); Robert L. Rosen, New Orleans, LA (US); Kevin W. Guernsey, Destin, FL (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/410,142

(22) PCT Filed: Jul. 3, 2013

(86) PCT No.: PCT/US2013/049309
§ 371 (c)(1),
(2) Date: Dec. 22, 2014

(87) PCT Pub. No.: WO2014/011478
PCT Pub. Date: Jan. 16, 2014

(65) Prior Publication Data
US 2015/0321852 A1    Nov. 12, 2015

Related U.S. Application Data

(60) Provisional application No. 61/669,241, filed on Jul. 9, 2012.

(51) Int. Cl.
*B65G 47/52* (2006.01)
*B65G 15/30* (2006.01)
*B65G 47/46* (2006.01)
(Continued)

(52) U.S. Cl.
CPC ............ *B65G 17/08* (2013.01); *B65G 17/345* (2013.01); *B65G 47/74* (2013.01); *B65G 47/96* (2013.01)

(58) Field of Classification Search
CPC ....... B65G 47/52; B65G 15/30; B65G 47/46
USPC ........... 198/370.06, 370.07, 370.1, 850, 851, 198/852, 853
See application file for complete search history.

(56) References Cited

U.S. PATENT DOCUMENTS 3,231,068 A * 1/1966 Harrison ................. B07C 3/082
198/370.06
4,096,936 A * 6/1978 Nielsen ................ B65G 17/067
198/370.06

(Continued)

FOREIGN PATENT DOCUMENTS

CN     101870374 A     10/2010
EP       1153860 A1    11/2001
(Continued)

OTHER PUBLICATIONS

European Search Report, Application No. 13816087A, mailed Mar. 24, 2016, European Patent Office, Munich, Germany.

*Primary Examiner* — Douglas Hess
(74) *Attorney, Agent, or Firm* — Catherine M. Bishop

(57) ABSTRACT

An article-diverting modular conveyor belt employs a gear-driven article mover on a conveyor belt module for selectively moving a conveyed article towards a side of the module. The article mover may be a transversely-extending flexible band or helical blade for carrying articles across the belt towards a side of the module. A toothed wheel connected to the article mover is selectively driven by a gear to induce movement of the article mover.

19 Claims, 10 Drawing Sheets

(51) Int. Cl.
*B65G 17/08* (2006.01)
*B65G 47/74* (2006.01)
*B65G 17/34* (2006.01)
*B65G 47/96* (2006.01)

(56) References Cited

U.S. PATENT DOCUMENTS

| | | | | |
|---|---|---|---|---|
| 5,701,992 | A * | 12/1997 | Enomoto | B65G 17/345 198/370.06 |
| 6,669,012 | B1 * | 12/2003 | Yoshida et al. | B65G 17/345 198/370.06 |
| 6,705,452 | B2 | 3/2004 | Greve et al. | |
| 7,080,725 | B2 * | 7/2006 | Hishinuma | B65G 17/345 198/370.06 |
| 7,104,387 | B2 * | 9/2006 | Brixius et al. | B65G 17/345 198/370.06 |
| 7,360,641 | B1 | 4/2008 | Fourney | |
| 7,506,751 | B2 | 3/2009 | Fourney | |
| 8,622,202 | B2 * | 1/2014 | Rau et al. | B65G 17/24 198/779 |
| 8,646,596 | B2 * | 2/2014 | Andersen | B65G 17/345 198/853 |
| 8,684,169 | B2 * | 4/2014 | Itoh et al. | B65G 13/075 198/370.06 |
| 2004/0094387 | A1 | 5/2004 | Lapeyre | |
| 2010/0032261 | A1 | 2/2010 | Sng et al. | |
| 2010/0078297 | A1 | 4/2010 | Andersen | |
| 2011/0073442 | A1 | 3/2011 | Rau et al. | |

FOREIGN PATENT DOCUMENTS

| | | |
|---|---|---|
| JP | 2003020108 A | 1/2003 |
| WO | 2011004213 A1 | 1/2011 |

* cited by examiner

US 9,463,931 B2

ARTICLE DIVERTING CONVEYOR BELT

BACKGROUND

The invention relates generally to power-driven conveyors and more particularly to article-diverting devices using gears and rotating article movers to transport articles in a selected direction.

Some conveying applications require that selected articles being conveyed along a main conveying path be diverted off the main path and conveyed away in another direction, while the rest of the articles continue to advance along the main path. But article-diverting devices tend to have a lot of moving parts, which can be difficult to clean and not practical for use in food-handling and other sanitary applications.

SUMMARY

An article-diverting conveyor belt embodying features of the invention comprises a plurality of modules hingedly connected together. At least one module includes a gear-driven transversely extending band or helical blade for carrying articles across the belt towards a side of the module. A toothed wheel connected to the article mover is selectively driven by a gear to induce movement of the article mover.

According to one aspect of the invention, a conveyor belt module comprises a deck extending in length from a first end to a second end and in width from a left side to a right side and having a top side and an opposite bottom side, a first pulley connected to the deck, a second pulley connected to the deck and an endless band trained around the first pulley and the second pulley.

According to another aspect of the invention, a conveyor belt module comprises a deck extending in length from a first end to a second end and in width from a left side to a right side and having a top side and an opposite bottom side, a toothed wheel adjacent to the deck and an article mover driven by the wheel and including a component that moves transversely relative to the top side of the deck.

According to another aspect of the invention, a conveyor comprises a first conveyor belt module, a second conveyor belt module hingedly connected to the first conveyor belt module and a gear. The first conveyor belt module has a deck extending in length from a first end to a second end and in width from a left side to a right side and having a top side and an opposite bottom side, a toothed wheel adjacent to the deck and an article mover driven by the toothed wheel and extending transversely relative to the top side of the deck. The gear engages the toothed wheel to selectively rotate the toothed wheel, thereby causing movement of the article mover.

BRIEF DESCRIPTION OF THE DRAWINGS

These features of the invention, as well as other aspects and advantages, are described in more detail in the following description, appended claims, and accompanying drawings, in which:

DETAILED DESCRIPTION

Figure 1:
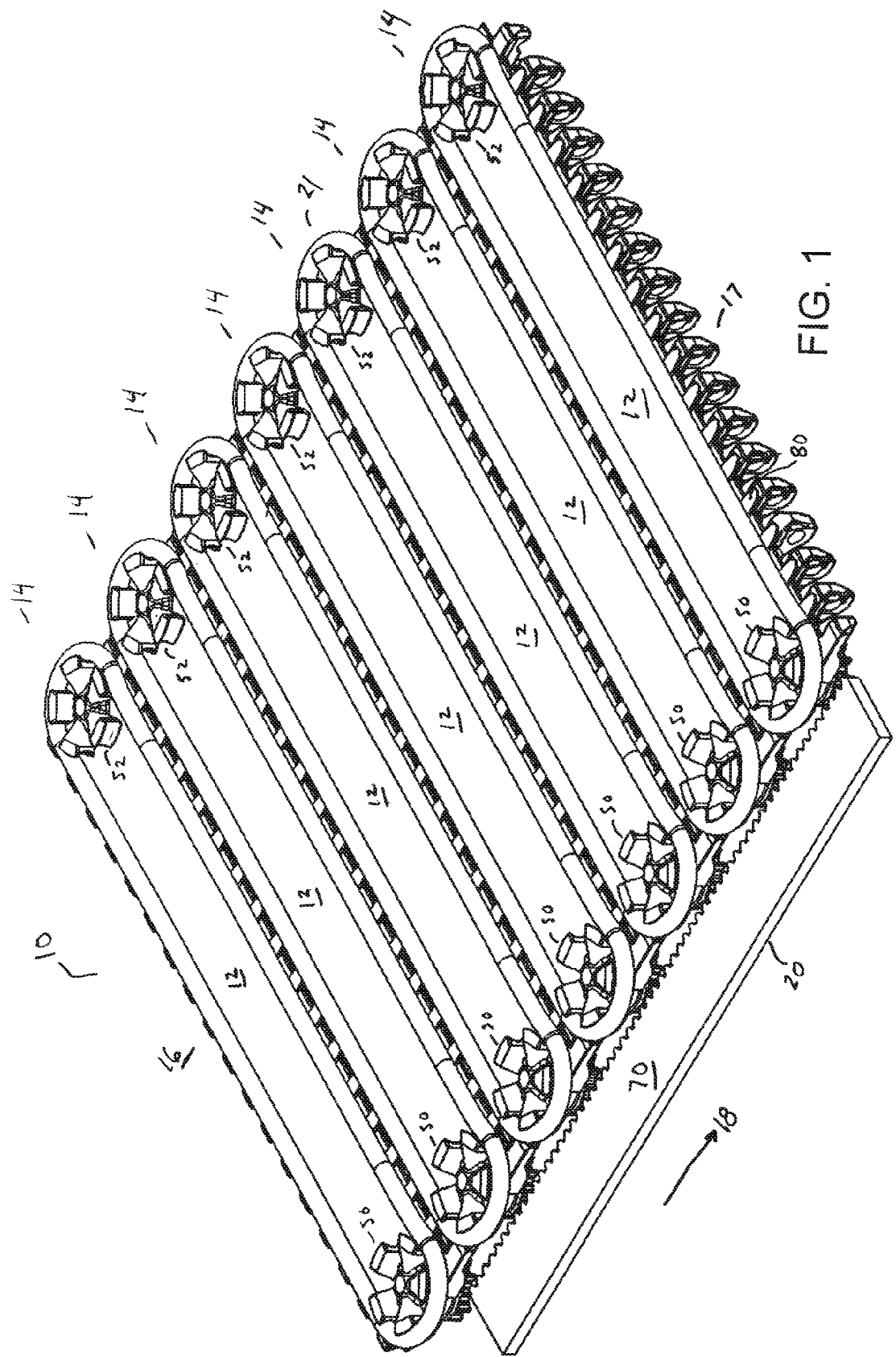
FIG. 1 is an isometric top view of a portion of a conveyor belt including transversely-extending flexible bands for diverting articles.
Figure 2:
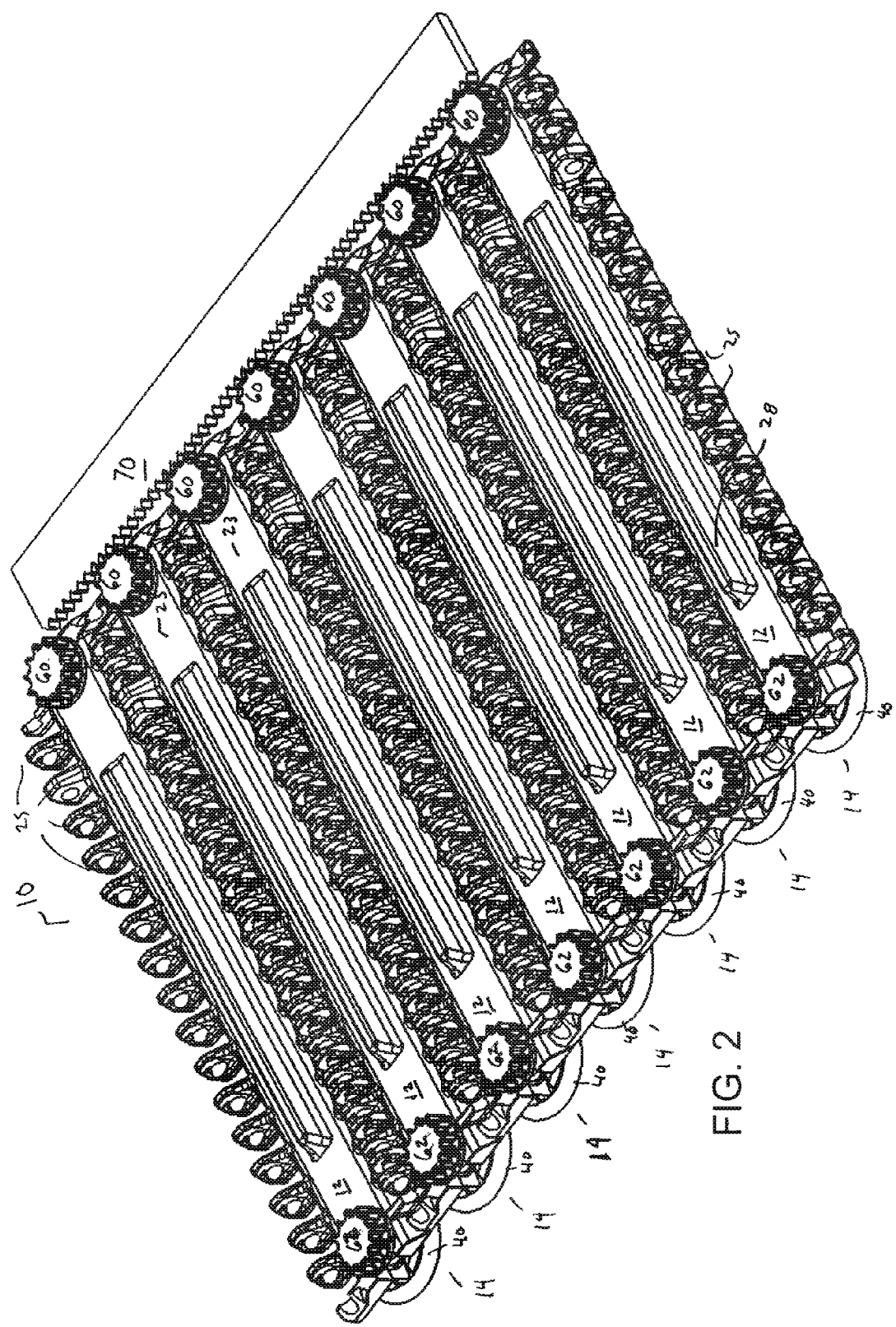
FIG. 2 is an isometric bottom view of the portion of the conveyor belt of FIG. 1.
Figure 3:
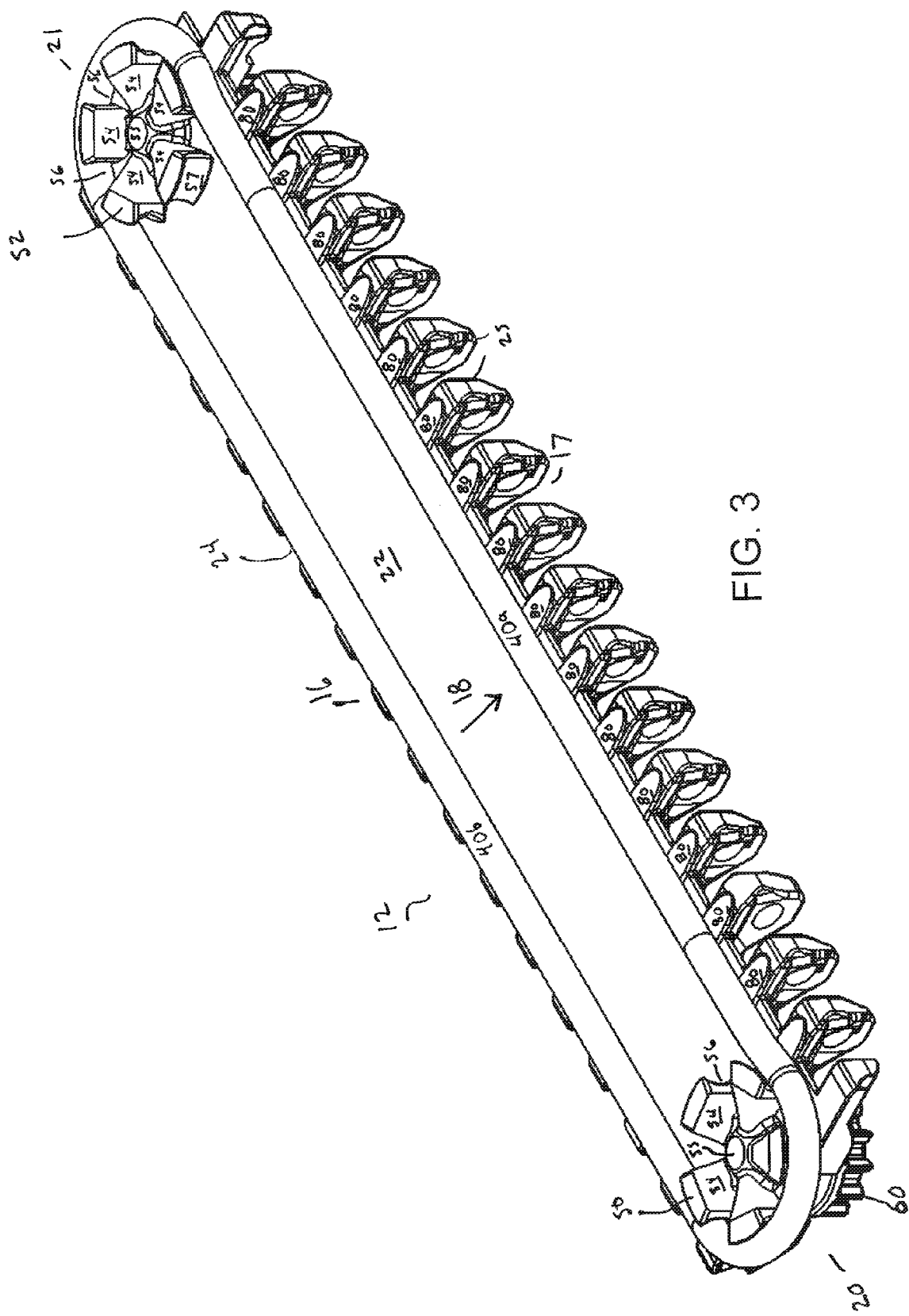
FIG. 3 is an isometric top view of one module of the conveyor belt of FIG. 1.
Figure 4:
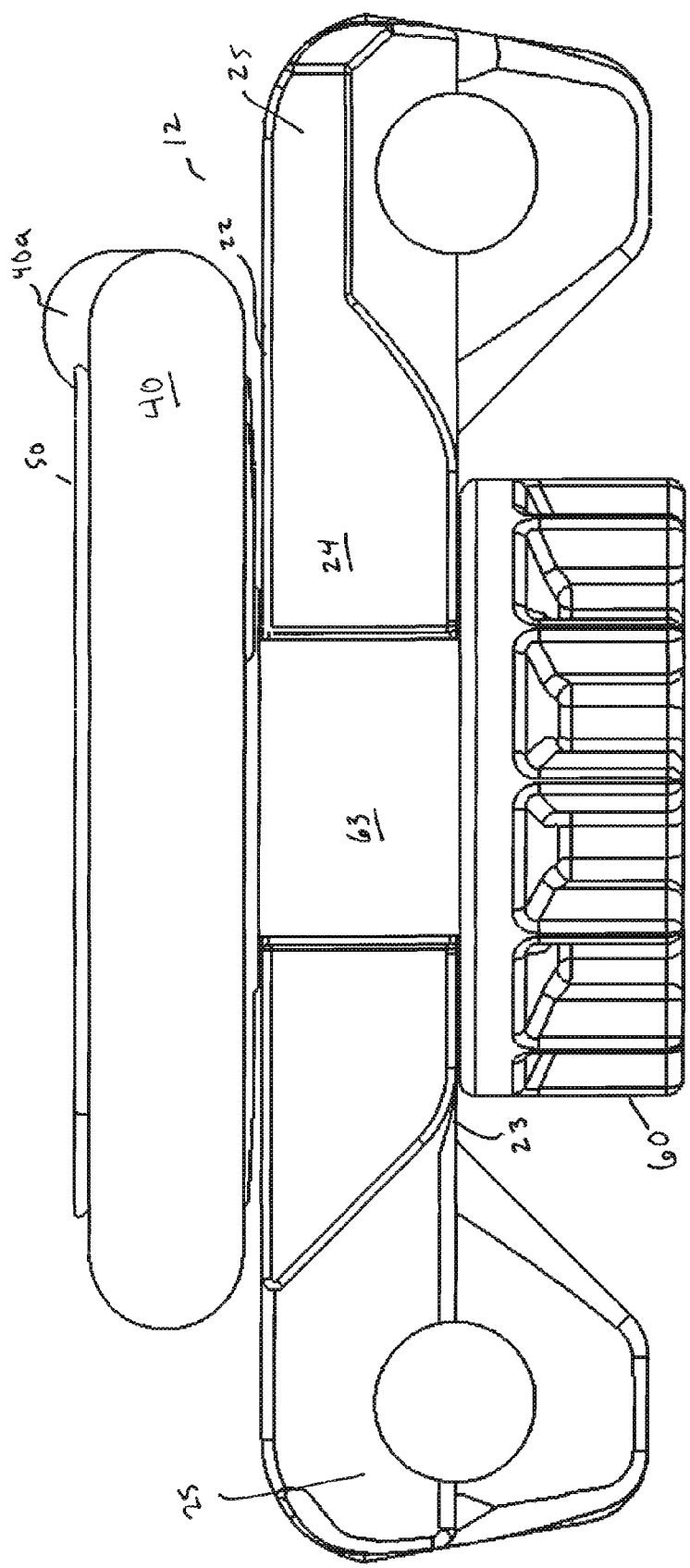
FIG. 4 is a side view of the module of FIG. 3.
Figure 5:
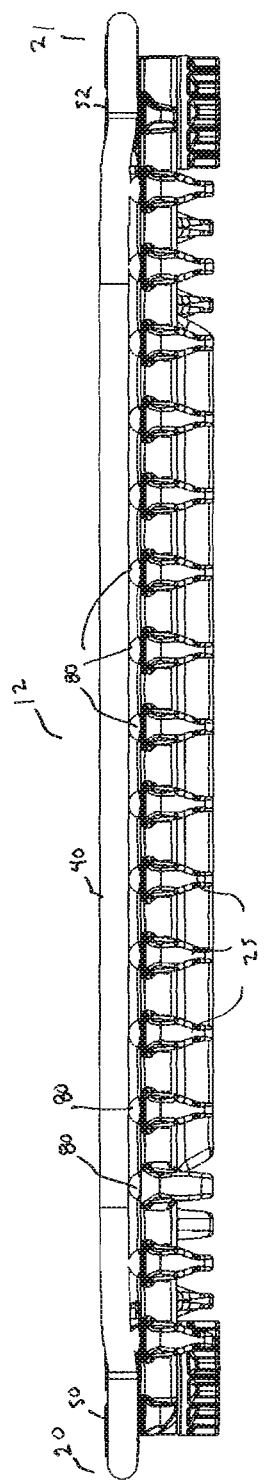
FIG. 5 is a front view of the module of FIG. 3.
Figure 6:
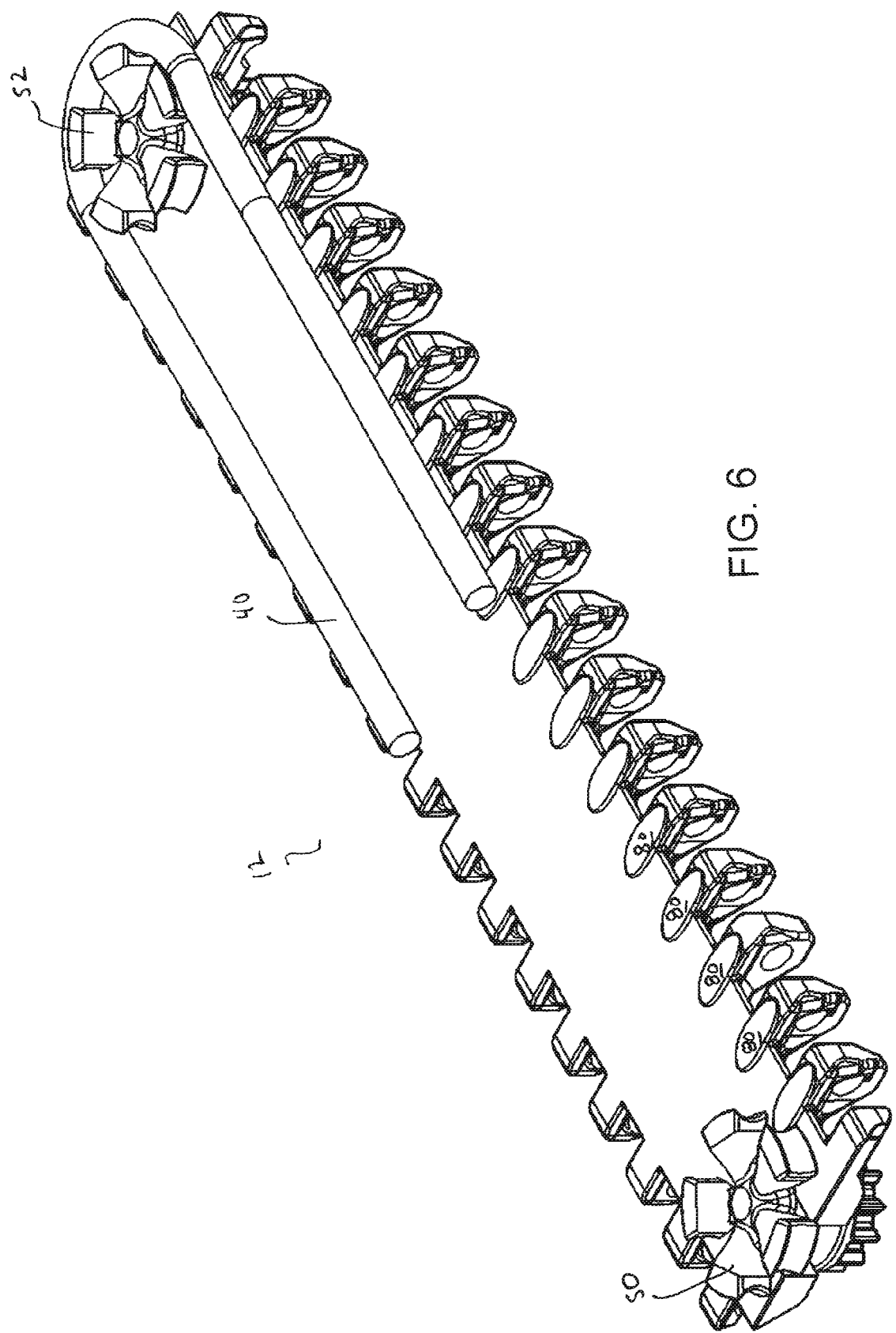
FIG. 6 is an isometric view of the module of FIG. 3 with a portion of the flexible band cut away.

FIGS. 1 and 2 show a portion of the conveyor belt usable as an article diverter embodying features of the invention. The conveyor belt 10 is constructed of a series of conveyor belt modules 12 arranged in rows 14. FIGS. 3-7 show different views of a conveyor belt module 12 according to an illustrative embodiment of the invention. Each conveyor module 12 extends in length from a trailing end 16 to a leading end 17 in a conveying direction 18, i.e., a direction of belt travel. The modules 12 extend in width from a left side 20 to a right side 21 and in thickness from a top conveying surface 22 to an opposite bottom surface 23. The bottom surface 23 may have drive elements, such as teeth 28, for driving the conveyor belt using a sprocket or other suitable driver. The module has a central deck 24 and hinge elements 25 spaced apart along the trailing and leading ends 16, 17 of the module 12. The hinge elements 25 are interconnected, by hinge pins, for example, at hinge joints between adjacent rows 14. Instead of a modular hinged belt, a slat conveyor belt constructed of slat modules between flanking roller chains could be used.

Each module 12 further includes an article mover for pushing products transversely, such as towards the left side or right side of the module. The article mover shown in FIGS. 1-7 comprises an endless flexible band 40 trained around two wheels, illustrated as pulleys 50, 52, disposed on the top surface 22 on opposite sides of the central deck 24. The illustrative band 40 comprises a round flexible endless band having a substantially circular cross-section, though other shapes are possible. The illustrative band may be formed of polyurethane, silicone, urethane or another suitable material.

In the illustrative embodiment, a first section of the band 40a spans the lead edge 17 of the module and a second section of the band 40b spans the lag edge 16 of the module. However, the sections of the flexible band 40 may be placed in any suitable location relative to the module.

Each pulley 50, 52 includes a plurality of spokes 54 radiating from a central hub 55 with spaces 56 in between to allow for cleaning. The illustrative spokes 54 expand in depth and width as they extend towards the rim of the pulley. Each spoke 54 terminates in a recessed outer surface 57 for receiving and guiding the band 40. The outer edges of the pulleys 50, 52 extend past the side 20 or 21 of the module. In an alternative embodiment, each pulley 50, 52 is a solid, spokeless structure including recesses in the outer edge for receiving the band 40.

Figure 7:
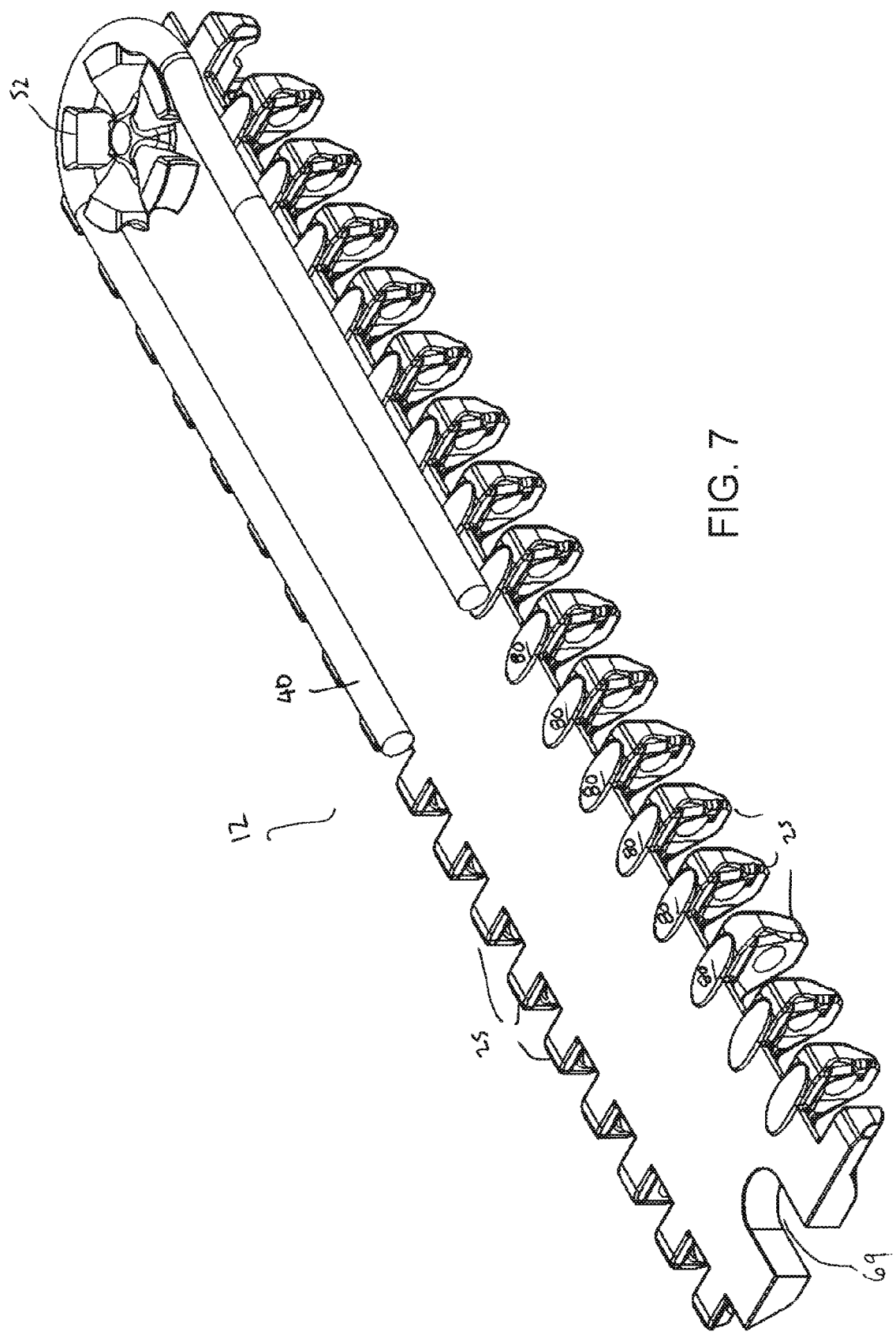
FIG. 7 shows the module of FIG. 6 with one of the pulley assemblies removed.

A gear may be used to drive one or both pulleys 50, 52 to selectively rotate the flexible band through a path over the top surface 22 of the module. A toothed wheel 60, 62 (gear) extends from the bottom of one or both pulleys and below the module. A neck 63, which may be integral, connects each pulley to a toothed wheel. A pulley assembly, comprising a pulley, neck and toothed wheel, may be coupled to the module by insertion into an opening 69 in the module deck, as shown in FIG. 7. The pulley assembly may be removable for cleaning.

A rack gear 70, shown in FIGS. 1 and 2, may engage the toothed wheels 60, 62 to selectively drive a pulley, causing the flexible band to travel around the pulleys. The rack gear 70 may be disposed in the carryway of the conveyor belt 10. As the conveyor belt 10 moves passed the rack gear 70, the rack gear 70 may engage the toothed wheel to selectively divert an article disposed on the flexible band 40. Other suitable gears for driving the toothed wheels may be used, and the invention is not limited to a rack gear.

A plurality of ribs 80 extend along the leading end 17 of the module below the path of the flexible band 40. The ribs 80 form a ridge for raising the band 40 on one side 40a so that articles placed on the belt engage only one section 40a of the band 40. Alternatively, the ribs may be formed on the trailing end 16. The ribs may have any suitable size, shape and configuration for raising a section of the band relative to another section of the band. As another alternative, the band can be wrapped twice around pulleys with wider grooves to raise the band on one side relative to the other. In this alternative, ribs may not be necessary.

An article product laid on module can be pushed to either side by rotating one of the pulleys 50 or 52. When the rack gear 70 engages and causes rotation of a toothed wheel 60 or 62, the associated pulley 50 or 52 also rotates, which moves the flexible band in a selected direction across the belt module. The raised section 40a pushes the article towards a side of the belt, depending on the direction of rotation of the wheels.

The bands of different modules can be independently controlled to allow the flexible bands 40 to be used to selectively rotate an article placed on the belt. The modules with flexible bands 40 can also be used to merge articles by diverting articles towards the middle of the module rather than to the side of the module.

Figure 8:
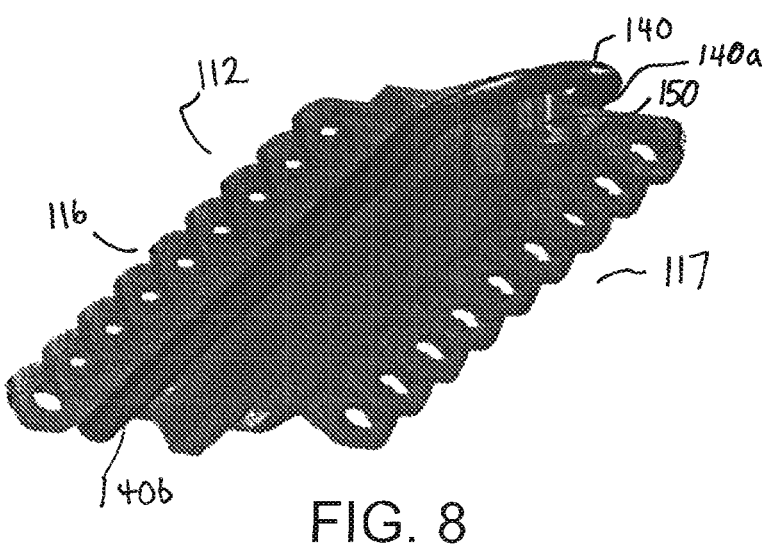
FIG. 8 is an isometric bottom view of a conveyor belt module including a transversely-extending flexible band according to another embodiment of the invention.
Figure 9:
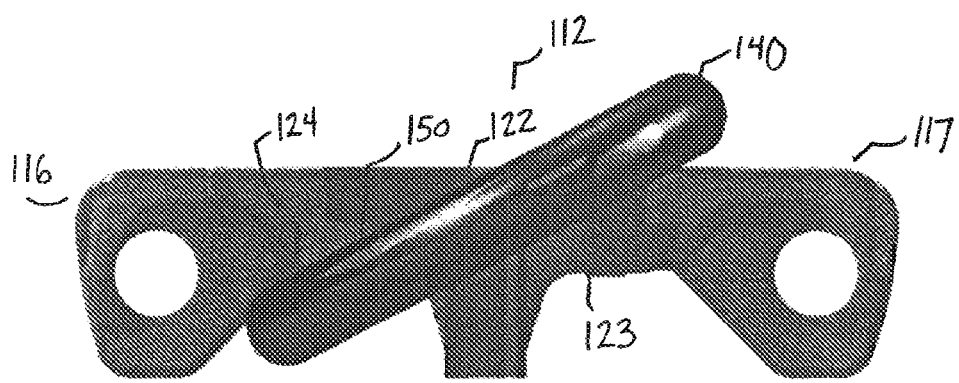
FIG. 9 is a side view of the conveyor belt module of FIG. 8.

FIGS. 8 and 9 illustrate another embodiment of a conveyor belt module 112 employing an article mover comprising a flexible band. In the embodiment of FIGS. 8 and 9, a flexible band 140 straddles the deck 124 of the module. Angled pulleys including hubs forming toothed wheels 150 on the sides of the module receive and guide the flexible band 140. A first section 140a of the band extends over the top conveying surface 122 and spans the leading end 117 of the deck 124 of the module 112. A second section of the band 140b extends over the bottom surface 123 and spans the lag end 116 of the belt. An article being conveyed rides on the top section 140a of the band 140. When one of the angled pulleys rotates, the pulley pushes the flexible band across the conveying surface, carrying the article towards one side of the module. The flexible band 140 returns along the bottom surface 123 of the module. A rack gear or other suitable mechanism may be used to selectively rotate the wheel 150 to induce lateral movement of the conveyed article. The illustrative flexible band 140 comprises a round flexible endless band having a substantially circular cross-section, though other shapes are possible. The illustrative band may be formed of polyurethane, silicone, urethane or another suitable material.

Figure 10:
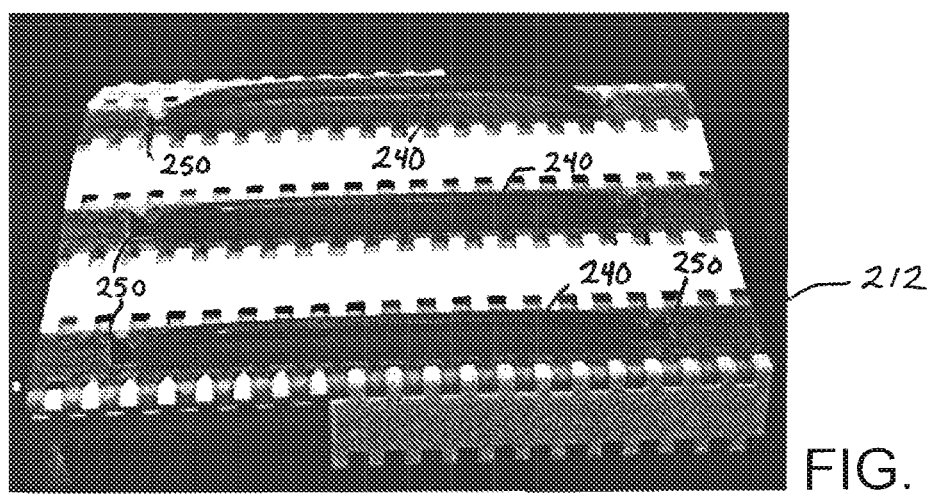
FIG. 10 illustrates a portion of a conveyor belt including transversely-extending flexible bands according to another embodiment of the invention.

FIG. 10 illustrates another embodiment of a conveyor belt comprising modules 212 employing round flexible bands 240 for moving articles. A top section of the flexible band 240 extends laterally across the top conveying surface 222 of the module. An article to be conveyed rests on the top section of the flexible band. Openings 250 in the deck of the module 212 allow the flexible band 240 to pass to the underside of the module, where it may be trained around wheels. The wheels rotate to move the flexible band in one of two directions, causing an article resting on the top section of the flexible band to move towards one side of the module. A gear or other suitable device may drive one of the wheels to selectively drive the flexible band 240.

Figure 11:
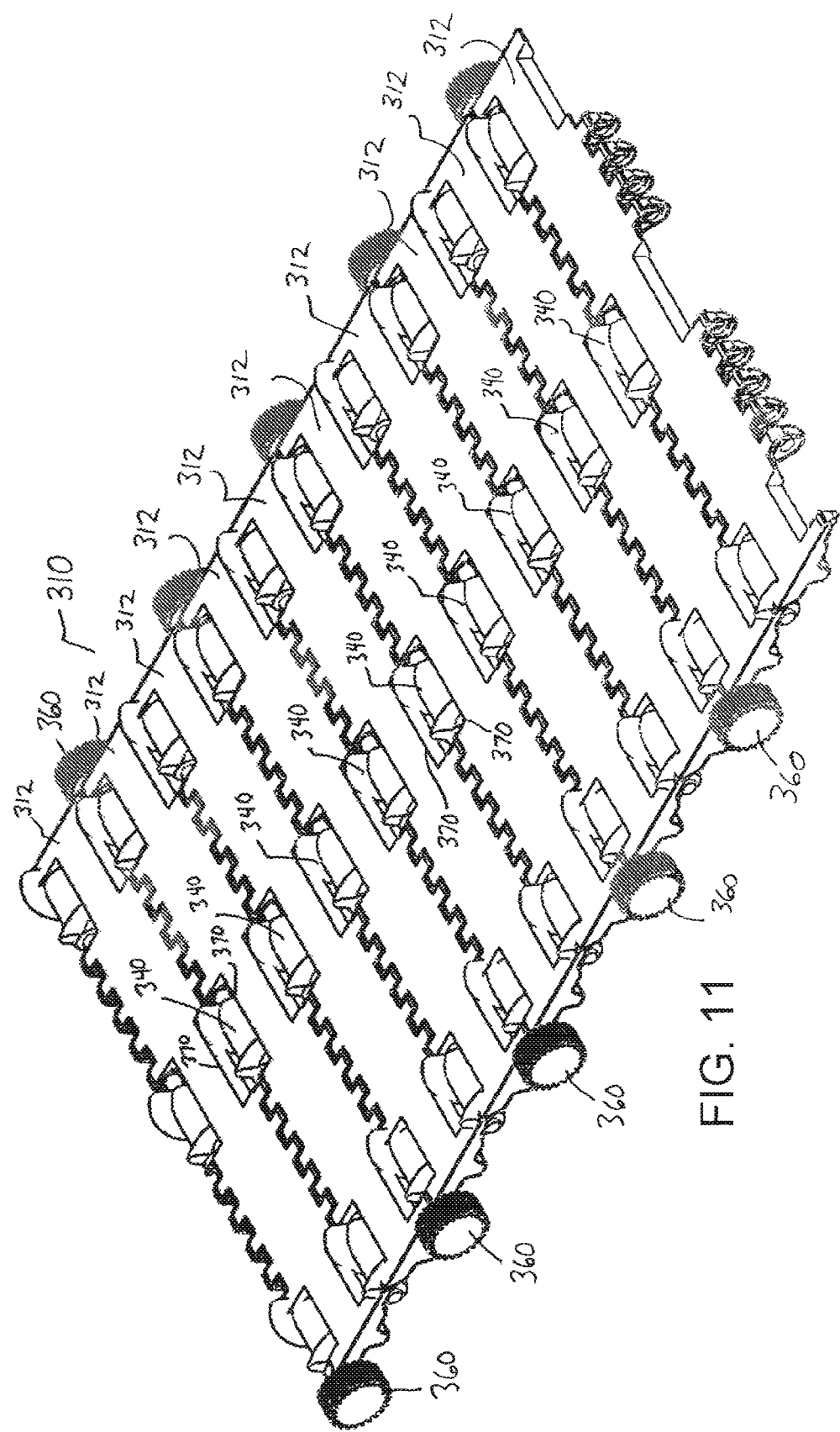
FIG. 11 is an isometric top view of a portion of a conveyor belt including a rotatable article mover having helical blades according to another embodiment of the invention.
Figure 12:
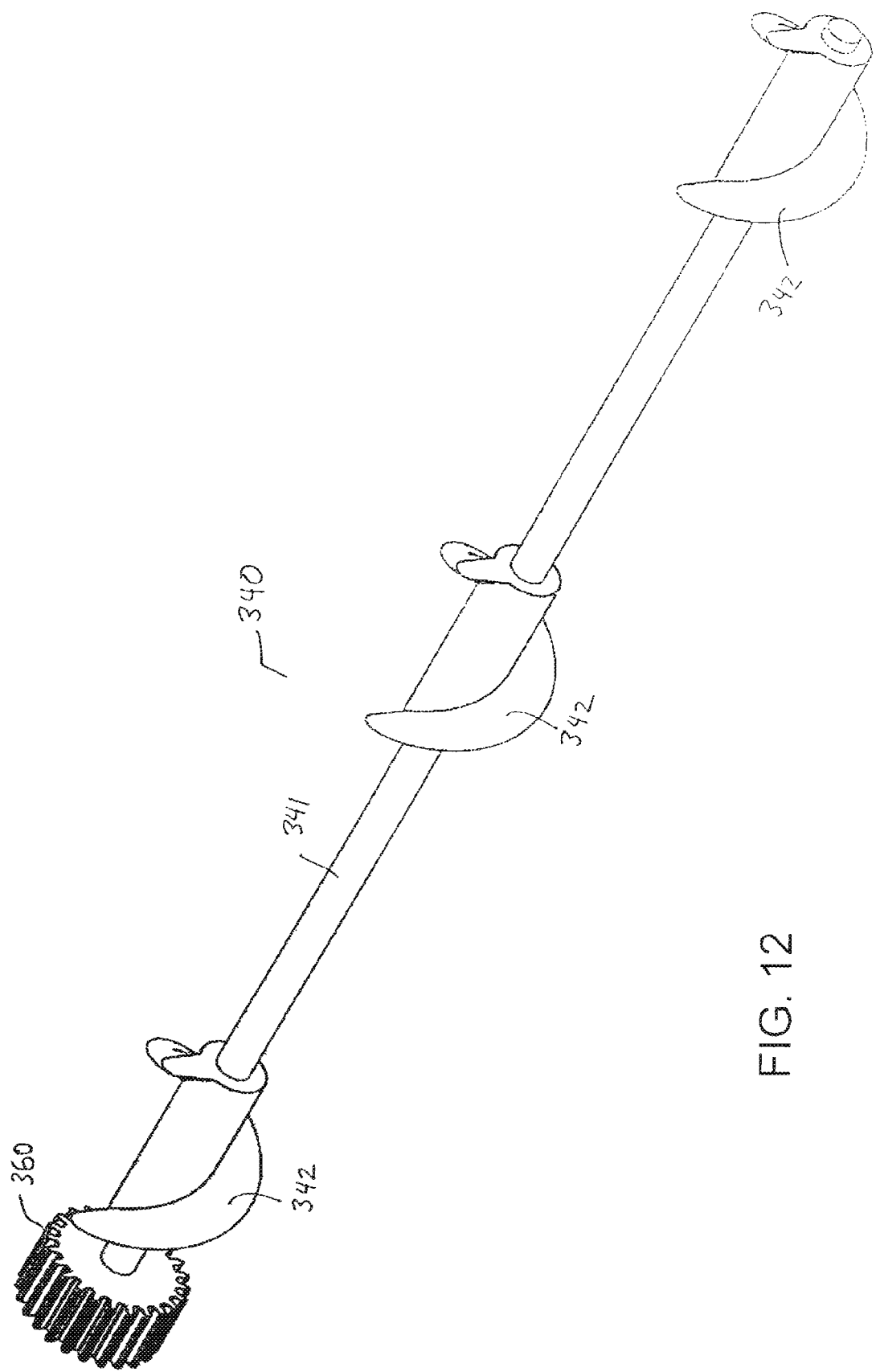
FIG. 12 illustrates the rotatable article mover of the conveyor belt of FIG. 11.

FIG. 11 illustrates another embodiment of a conveyor belt including an article mover for pushing an article towards a side of a module of the conveyor belt. The conveyor belt 310 comprises a series of modules 312 hingedly connected together. Each module includes an article mover 340, shown in FIG. 12, comprising a shaft 341, helical blades 342 formed on the shaft and an end wheel 360 for selectively rotating the shaft 341. The illustrative article mover comprises three separate helical blades. Conveyed articles ride on the edges of the helical blades at their topmost points.

Each article mover 340 is rotatably supported between adjacent conveyor belts, or within a single module. In the illustrative embodiment, each module includes recesses 370 at leading and lagging edges. When hinged together, the recesses form openings for receiving the helical blades. The shaft 341 may serve as a hinge rod for lacing adjacent modules together.

The article movers may alternate in orientation, so that the end wheel 360 is disposed at alternating sides for adjacent modules.

A gear rack or other suitable mechanism selectively rotates the end wheel 360 to cause rotation of the shaft 341 about an axis of rotation. The rotation of the shaft 241 causes rotation of the helical blades 342, which push an article placed thereon towards one side of the module, or towards the middle of the module, or off the module entirely.

Although the invention has been described with reference to specific versions, other versions are possible. The scope of the invention is not meant to be limited to the exemplary versions described in detailed.

What is claimed is:

1. A conveyor belt module, comprising:
   a deck extending in length from a first end to a second end and in width from a left side to a right side and having a top side and an opposite bottom side;
   a first pulley connected to the deck;
   a second pulley connected to the deck;
   an endless band trained around the first pulley and the second pulley; and
   a ridge formed on the first end or second end of the deck for raising a portion of the flexible band.

2. The conveyor belt module of claim 1, further comprising hinge elements extending from the first end and the second end of the deck.

3. The conveyor belt module of claim 1, wherein the endless band comprises a first portion extending across the top side of the deck and a second portion extending below the bottom side of the deck.

4. The conveyor belt module of claim 1, wherein the first pulley is formed at the left side of the module and the second pulley is formed at the right side of the deck.

5. The conveyor belt module of claim 1, wherein the first pulley and second pulley are formed below the bottom side of the deck.

6. The conveyor belt module of claim 1, wherein the first pulley and the second pulley are formed above the top side of the deck.

7. The conveyor belt module of claim 1, further comprising a driver for turning the first pulley to cause the endless band to travel across the deck.

8. The conveyor belt module of claim 1, wherein the endless band comprises polyurethane, silicone or urethane.

9. The conveyor belt module of claim 1, wherein the endless band has a round cross-section.

10. The conveyor belt module of claim 1, wherein the first pulley and second pulley each comprise a central hub and a plurality of spokes.

11. The conveyor belt module of claim 1, wherein each pulley includes a recessed outer surface for receiving and guiding the band.

12. The conveyor belt module of claim 1, wherein each pulley is connected to a toothed wheel for selectively driving the pulley.

13. A conveyor belt module, comprising:
- a deck extending in length from a first end to a second end and in width from a left side to a right side and having a top side and an opposite bottom side;
- a toothed wheel adjacent to the deck; and
- an article mover driven by the toothed wheel and extending transversely relative to the top side of the deck, the article mover comprising a shaft having helical blades that push an article towards the left side or the right side of the deck when the shaft rotates.

14. The conveyor belt module of claim 13, wherein the toothed wheel is connected to an end of the shaft.

15. The conveyor belt module of claim 14, further comprising an opening in the deck for receiving the helical blades, wherein the helical blades protrude above the top side of the deck.

16. A conveyor comprising:
- a first conveyor belt module having a deck extending in length from a first end to a second end and in width from a first side to a second side and having a top side and an opposite bottom side, an endless flexible band trained around first pulley disposed on the top side at the first side and a second pulley disposed on the top side at the second side and a toothed wheel below to the deck connected to the first pulley;
- a second conveyor belt module hingedly connected to the first conveyor belt module; and
- a gear for engaging the toothed wheel to selectively rotate the toothed wheel, thereby causing movement of the endless flexible band.

17. The conveyor of claim 16, wherein the endless flexible band comprises a first section that spans the first end of the first conveyor belt module and a second section that spans the second end of the first conveyor belt module.

18. The conveyor of claim 16, wherein each pulley comprises a recess in an outer edge for receiving the endless flexible band.

19. The conveyor of claim 16, further comprising a neck extending through an opening in the deck for connecting the toothed wheel and the first pulley.

\* \* \* \* \*